United States Patent [19]
Baker et al.

[11] 3,891,774
[45] June 24, 1975

[54] SOFT TEXTURED DRY PROTEIN PRODUCT AND METHOD FOR FORMING SAME

[75] Inventors: Richard J. Baker, St. Louis; Timothy A. Miller, Ferguson; Gary K. Erlinger, St. Charles; Stephanus F. Loepiktie, St. Louis; Larry R. Hanselman, Affton, all of Mo.

[73] Assignee: Ralston Purina Company, St. Louis, Mo.

[22] Filed: Oct. 17, 1973

[21] Appl. No.: 407,370

Related U.S. Application Data

[63] Continuation of Ser. No. 38,601, May 18, 1970, abandoned.

[52] U.S. Cl. ............ 426/104; 426/141; 426/204; 426/205; 426/212; 426/364; 426/802
[51] Int. Cl. ........................................ A23j 3/00
[58] Field of Search .......... 426/212, 141, 104, 204, 426/205, 364

[56] References Cited
UNITED STATES PATENTS

| 3,202,514 | 8/1965 | Burgess et al. | 99/2 |
| 3,488,770 | 1/1970 | Atkinson | 99/17 |
| 3,653,908 | 4/1972 | Buck et al. | 99/2 |
| 3,684,522 | 8/1972 | Anker et al. | 99/17 |

*Primary Examiner*—James R. Hoffman
*Attorney, Agent, or Firm*—W. Dennis Drehkoff; Lawrence J. Hurst

[57] ABSTRACT

A method of preparing an expanded food product having a very low moisture content is disclosed. The product may be prepared from a secondary protein source at its ambient moisture content by reacting the protein source under heat, pressure, and mechanical working in the presence of an organic solvent such as glycerol. The worked material is extruded through an orifice into a medium of lower pressure where the water content flashes off as steam causing the reacted material to expand into a meat-like cellular product. The organic solvent is retained in the cellular structure to produce a product having a soft dry resilient texture resembling the properties of natural meat.

34 Claims, No Drawings

SOFT TEXTURED DRY PROTEIN PRODUCT AND METHOD FOR FORMING SAME

This is a continuation of application Ser. No. 38,601 entitled SOFT TEXTURED DRY PROTEIN PRODUCT AND METHOD FOR FORMING SAME filed on May 18, 1970 now abandoned.

BACKGROUND OF THE INVENTION

During recent years extensive research and development efforts have been applied toward the development of meat-like or meat simulating food materials prepared from secondary protein sources, particularly protein-containing vegetable substances. As is known, the chief nutritional value of meat is due to its protein content. However, although meat is a most desirable source of protein, from the consideration of eating pleasure, the production of meat is actually relatively inefficient in terms of feed input to food output. Furthermore, certain crops such as soybeans provide inexpensive by-products which have a high percentage of potentially available protein, but which are not normally palatable and/or edible.

One excellent technique for producing meat simulating edible foods from secondary protein sources, such as soybean meal, is taught in U.S. Pat. No. 2,682,466. This technique involves the creation of a large number of small diameter spun fibers which are then gathered into bundles or "tows" and thence formed into various type edible products with subsequent operations. While these products are of high quality, the process is complex and expensive, so that the products must be priced in the general range of the corresponding actual meat products. Moreover, the product output per expense unit of equipment is relatively small.

Consequently, there has existed a definite need for a relatively inexpensive method of treating protein-containing vegetable materials to produce a product which would bear a resemblance to actual meat in appearance, physical structure and texture, and chewing and mouthfeel characteristics, and that could be practiced sufficiently inexpensively that the product could be priced at a small fraction of the price of actual meat products.

Recently, it has become possible to produce inexpensive protein products by an extrusion process. The process involves adding moisture to a soybean protein source material, extruding the material at elevated temperatures and pressures to produce a puffed, expanded product, and drying the product to a dry state. An extrusion process for producing dry puffed protein products is disclosed in U.S. Pat. No. 3,496,858. The process and product of the present invention constitute a distinct improvement over the art of producing extruded secondary protein source materials and possess unusual and unexpected advantages over the art.

SUMMARY OF THE INVENTION

It is a primary object of this invention, therefore, to provide a unique relatively inexpensive method of treating secondary protein sources to convert them from a generally unpalatable substance to a highly palatable and desirable product that has a desirable soft dry texture which resembles meat in appearance, resilience, chewing characteristics, and nutritional value. Further, these properties and characteristics can be controllably varied quite readily by the method.

Another object of this invention is to provide a novel method of producing highly nutritional, highly palatable meat simulating food products from secondary protein sources, particularly soybean meal, such that the method is capable of relatively high production, continuous product output per expense unit of equipment. Moreover, the amount of protein in the product can be greatly varied as desired.

Another object of this invention is to provide a novel method of producing a meat simulating product which is rapidly and inexpensively dried as it is produced, capable of conventional packaging for extended unrefrigerated storage in its dry condition, and stabilized against bacterial and mycotic growth. Further, the stored product can be rapidly rehydrated in a matter of seconds, in a very simple manner, without cooking, heating, autoclaving, or steaming, but rather merely by the addition of aqueous liquid.

Another object of this invention is to provide a novel method of producing a puffed, expanded protein product by extruding a secondary protein source at the equilibrium water content to provide a product which is dry and stable against bacterial and mycotic growth. The dry product can be used as a nutritional meat substitute.

Another object of this invention is to provide a novel highly palatable, highly nutritional meat simulating food product from secondary protein sources, particularly soybean meal, which is capable of being packaged, shipped and stored for substantial periods, without refrigeration, which has a soft, pliable texture in the dry state, and which is capable of rehydrating in moments merely by the addition of moisture, and without requiring cooking, autoclaving or pressurizing.

Another object of this invention is to provide, from a secondary protein source, particularly soybean meal, a meat simulating food which has a fibrous lace network structure appearing and acting somewhat like the muscle fibers in actual meat, but which product has a cost of only a fraction of that of meat.

Another object of this invention is to provide, from secondary protein sources, a meat simulating product capable of inexpensive and rapid dehydration, and of subsequent simple and rapid rehydration, to effect a meat simulating food stuff having all the beneficial characteristics of meat but at a cost of about one fifth of that of meat.

DESCRIPTION OF THE PREFERRED EMBODIMENTS

The concept of this invention pertains broadly to a unique processing treatment of secondary protein source products to obtain a meat-like food material. Secondary protein sources include the proteinaceous by-product meats such as meat meal and poultry meal; the oilseed meals such as soybean meal and cottonseed meal; and microbial protein sources such as torula yeast, petro protein, and Brewers' yeast. The most beneficial results are achieved when the novel concept is applied to soybean meal, since it is a readily available and highly nutritious protein source. In fact, by properly treating soybean meal according to this invention, a top grade expanded product containing a fibrous network simulating meat tissues is obtained.

Soybean meal is the product resulting after oil is extracted from comminuted soybeans and is commonly called defatted soybean flakes. Soybean meal usually is in a flake type particulate form. It could, however, be ground into a finer form such as powder. These various physical sizes and forms are broadly considered with the term soybean meal. Typically, the soybean meal has an equilibrium water content of about 10% or less by weight under normal ambient conditions of temperature and humidity. Under conditions of extreme humidity the equilibrium moisture content may reach as much as 12% by weight, though this would be a rare occurrence. The normal range of equilibrium moisture for a soybean meal is between about 7 to 10% by weight. If desired, the moisture content of the proteinaceous source material may be reduced prior to extrusion by drying the materials. It is quite possible to reduce the moisture content to as low as 4% by weight prior to extruding the mixture.

A controlling factor in processing the secondary protein source, such as soybean meal, is the protein content of the composition. Typically, soybean meal resulting from conventional oil extraction processes has a protein content of about 44% or 50% by weight, depending on the degree of refinement. Normally a protein content of less than about 44% is not encountered, although this process is intended to encompass vegetable materials having a protein content less than this. A typical protein concentrate which can be added to increase the protein is commercially termed "isolated protein." Experimentation with this process shows that a soybean meal with a protein content of about 50% by weight produces the most desirable product, with optimum fibrous network formation and optimum expansion. Hence, preferably, the operation is conducted on this material. However, the method does produce some fibrous formation in soybean meals having a protein content of about 30%, but below this value the product is not very worthwhile. Furthermore, the protein content can be increased substantially above 50%, up to about 75%. Above this the resulting product tends to have a gummy characteristic which is not desirable. Hence, preferably, the protein content in the soybean meal should be between about 30% and 75% by weight, with the preferred amount being about 50% by weight. The protein used in the process may be all from a single source or the protein sources may be mixed, for example, soy and microbial protein may be mixed and extruded.

The crucial factor in extruding secondary protein source materials at the equilibrium moisture content—usually between 7 to 10% by weight water—is to provide the secondary protein source with an organic solvent which acts to plasticize the reactant mass in the extruder. Typically, an organic solvent such as glycerol, propylene glycol (1,2-propanediol), or a mixture of glycerol and propylene glycol is used. Other organic solvent materials which are liquids at the extruder temperatures and pressures may be used if they provide the desired plasticizing action, for example, ethanol. However, I have discovered that if glycerol, propylene glycol, or mixtures of glycerol and propylene glycol are used, the finished product exhibits an unexpected increase in the stability of the product as well as having an unusual soft dry meat-like texture.

The shelf stability of dry protein products is good, but extruded, dry protein products are still susceptible to a variety of microbial and mycotic growths, particularly in humid climates. Reducing the water content of the extruded material below the equilibrium level by extruding equilibrium protein sources and puffing to eliminate moisture to below the equilibrium level, and by replacing the lost water with glycerol and/or propylene glycol, produces soft dry plasticized fibrous material which has exceptional shelf stability. The organic solvent treatment plasticizes the finished product to give it the desirable soft dry texture and increase the mycotic and bacterial stability significantly.

The organic solvent is added to the secondary protein source material, such as soybean meal having an equilibrium moisture content of about 7 to 10% by weight, usually at a level of between about 10 and 50% by weight. A preferred level of addition for the organic solvent is about 25% by weight. The organic solvent is added to the secondary protein source, preferably in a finely ground state, and the solvent is allowed to permeate the solid material. The solvent treated protein material is then subjected to an extrusion process. The solvent may also be metered directly into the feed section of the extruder device simultaneously with the secondary protein source. When the method is practiced in this manner the feed section of the extruder acts as a mixing device.

The process of this invention may be practiced on a conventional extrusion device, such as that disclosed in U.S. Pat. No. 3,496,858. The rotating screw of the extruder device, in combination with the restrainer plate in the extruder, creates a high pressure on the material in the extruder. The particulate meal fed in changes form until it finally flows in a generally fluid manner squeezing around the outer periphery of the screw in a recirculating fashion, to cause a severe mechanical working of the substance. The pressures in the extruder are elevated to several hundred psi, and normally fall within the range of about 300 to 800 psig. Part of the pressure is caused by the screw and restrainer plate. Part of the pressure is due to the high temperatures which result both from friction between the flowing product and components of the extruder and from heat that is purposely added to the outside of the extruder in normal operation. This added heat is preferably obtained by passing steam and/or water through a forward or front annular jacket within the extruder housing, around, but separated from, the forward end of the extruder chamber. The amount of heat applied is controlled by typical valving techniques in a manner to obtain temperatures which are not sufficiently high so as to cause the product to scorch or burn, but which are sufficiently high to cause the desired chemical and physical reactions within the material. The amount of added heat to do this will vary with the particular extruder construction, but can be readily determined by trial and error during the initial stages of operation of the equipment. It may also be advantageous to add a small amount of steam directly into the extruder, for example, about 1 to 5% by weight of the mix, to increase the fibering of the material.

The temperatures reached by the material in the extruder must be above 212° F. and actually should be considerably higher, within a certain specific range in order for a meat simulating product with good fibrous network structure to be formed. Typically, the temperature will be between about 370° to about 270° F. Below about 270° F., fibrous network formation is poor. The preferred temperature range is about 280° to 320° F., with optimum results having been obtained at about 300° F.

In addition to the steam jacket for adding heat, an annular cooling jacket surrounds the rear portion of the extruder chamber. This has been found desirable in normal operation to maintain lower temperatures in the initial stages of operation.

The product exit means from the extruder may also include a smaller secondary chamber into which the material discharges from the outlet orifice. The output from this second smaller chamber is also restricted by a die nozzle. It has an area smaller than or about that of the outlet orifice. This two-stage restriction set up aids in obtaining acceptable fibrous network formation in the product. Another feature of the extruder which helps in forming good quality fibers is an elongated pipe member between the outlet orifice and die nozzle. It normally has a diameter substantially smaller than the diameter of the extruder chamber to which it is attached, such diameter ratios normally being about 1/6 to 1/12. The product is longitudinally passed through this member while still radially restricted, along the length of the tube, under high pressures and at the elevated temperatures prior to being ejected into the lower pressure and temperature of the atmosphere. The tube has a length of about 8 to 12 times its internal diameter. In actual dimensions, a representative example of these components would include an extruder chamber diameter of about 5 inches, with a length of 3 to 4 feet or so, and a tube diameter of three-fourths of an inch and length of about 6 inches.

OPERATION

In operation, an organic solvent, such as glycerol or propylene glycol, is added to the soybean meal having the equilibrium moisture content at a level of 10 to 50% by weight of the resulting mixture. The solvent and meal are mixed into a homogeneous mixture. Additional water could be added to the mixture, but the added water would not normally be desirable. Indeed, the added water would be a liability in that additional power would be required to heat the unnecessarily added water in the reaction mass and additional power would be required to dry the extruded product. A fiber increasing additive, such as sulfur, may also be added to the protein source to increase the fibering tendency of the protein. Sulfur, if used, is added to the protein at a level of about 0.1 to 3.0% by weight. A sulfur addition of about 0.25 to 0.5% by weight has generally proven to be satisfactory.

When the mixture is prepared and ready for the extrusion operation, it is fed into the extruder inlet while the extruder screw is rotated at a substantial speed, for example, of about 150 rpm. During this operation, steam is passed through forward jacket, and normally, cooling water is passed through rear jacket. The meal mixture is advanced in the extruder by the screw while its temperature is increased to within the range of 270° to 370° F. by the steam heat added, by the mechanical working friction, and possibly by the chemical changes occurring. Since the screw tends to advance the material faster than it can be passed through the restricted outlet means, the pressure builds up in the chamber to several hundred pounds per square inch, usually about 300 to 800 psi, while the product is severely mechanically worked in the extruder. By the time the mixture reaches the extruder restrictor plate, it is in the form of a flowable substance which is forced from the main extrusion chamber, after a retention time of usually 20 to 40 seconds, through the outlet orifice into the supplemental chamber. The material remains under elevated pressures and temperatures as it is advanced by pressure differential through the secondary chamber through the elongated tube, to the die outlet nozzle. As it emerges from the nozzle under the high internal pressures into the much lower atmospheric pressure, the super heated equilibrium moisture partially flashes off by evaporation to cause product expansion and partial cooling. The puffed product is substantially dry when it has flashed its equilibrium moisture. Normally the residual water content of the material will be between about 3 to 7% by weight. The dried product retains a pleasing soft, dry texture due to the plasticizing effect of the organic solvent. If the product is being processed properly, it emerges in the form of a continuous elongated expanded fibrous member which can be kept in its continuous form or severed into individual chunks as it emerges by any ordinary cut off means. Preferably, the cut off should result in a tearing action which will stretch the cellular lattice structure into an elongated fiber-like form. The expanded product is very porous and has a fibrous network or lace structure which resembles that of actual meat tissue fibers. Normally, it is desirable to add coloring materials to the product before extrusion, and to add flavorings before or after extrusion. The product is very nutritious as it emerges, is sterile, palatable, and wholesome. The residual organic solvent in the fibrous structure, usually from about 8 to 40% by weight, plasticizes the dry material, giving it a pleasing soft, dry resilient texture. The organic solvent, glycerol and/or propylene glycol, greatly increases the stability of the dry product and the resistance to bacterial and mycotic spoilage. In addition, the soft, dry texture and residual solvent content significantly increases the palatability of the product. Indeed, the product is extremely palatable when eaten dry or when rehydrated with water and eaten. If portions of the product are pulled apart with one's fingers, the texture appears and acts like that of meat. If increased softness and mycotic and bacterial resistance is desired, additional solvent can be added to the product by impregnating it, by spraying, or by dipping the fibers in a solvent bath. The preferred solvent content of the fibrous product will be normally from 15 to 40% by weight.

An important feature of this product is that it can be completely rehydrated extremely rapidly, i.e., in a few seconds, with great ease, i.e., merely by adding an aqueous liquid. Thus, whenever it is to be eaten, the dried chunks may be rehydrated by mixing with aqueous liquid such as pure water, which is preferably warm so that it would be at a desirable eating temperature. The rehydrated product exhibits all of the desirable noted meat simulating characteristics. No cooking, autoclaving, or pressurizing is necessary for rehydration.

The resulting product can be used for human food, e.g., "health foods," or, due to its cost being only about 1/5 or less of that of conventional meat, it can be economically used for pet foods. Palatability and nutrition tests have proven it to be an excellent and desirable food for pets or other animals. The product provides an excellent pet food which is highly palatable to animals when eaten in its soft dry state or when rehydrated with water and eaten. The material can be employed in a variety of forms, can be colored and/or flavored in a variety of fashions, and can be controllably varied in characteristics, to resemble various types of meat materials.

By controlling the rate of feed of the product through the extruder, temperatures, degree of expansion, additives, protein content, organic solvent additives and the like, the character of the product can be widely varied while retaining its fibrous meat simulating texture and its pleasing soft character. The possibilities of this food product are many.

Although the inventive concepts will be readily understood from the above description by one having ordinary skill in the art, the following examples are given to assure a complete understanding:

EXAMPLE 1

Toasted solvent extracted soybean meal having a protein content of 50% by weight, an equilibrium moisture content of about 8% by weight and a fat content of 0.5% by weight was extruded at the equilibrium moisture content. 27.6% by weight of glycerol was metered into the extruder feed section with the soybean meal. A conventional extrusion device was used with steam and water being supplied to the front jacket to maintain an exit water temperature of 150° to 180° F. and cooling water at room temperature being constantly passed through the rear jacket. The opening in the restraining plate was 1/4 inch in diameter, with the screw being rotated at about 150 rpm. The mixture was thus mechanically worked within the extruder at a temperature of around 300° F., with the pressures varying somewhat, but being generally above 300 psig. The material was continuously passed through the extruder, passing through the elongated tube and out an extruder nozzle having a size of ¼ inch×¼ inch. The retention time of the material within the extruder was about 20 seconds. The mixture was ejected from the nozzle in a continuous stream and was a coherent fibrous structure which expanded with passage through the nozzle to form a porous structure. The product, when removed, had an excellent soft dry textured fibrous meat-like quality, a moisture content of 4.39% by weight (method of Karl Fischer), and a glycerol content of about 24.8% by weight.

EXAMPLE 2

Another run similar to Example 1 was made, but in this instance 50% by weight of glycerol was added to the soybean meal as it passed into the feed section of the extruder. The mixture passed through the extruder at pressures generally of about 400 psig and at a temperature of about 300° F. The resulting product had good fibrous formation, a moisture content of 4.16% by weight, and a glycerol content of about 46.5% by weight. A dry soft textured product was obtained.

EXAMPLE 3

This operation was just like that in Example 1 above, except that 12.5% by weight of glycerol and 12.5% by weight propylene glycol were added to the soybean meal. The resulting extruded product had a moisture content of 2.5% by weight, a propylene glycol content of 10.35% by weight, and a glycerol content of 11.08% by weight. A good soft dry textured fibrous material was obtained.

EXAMPLE 4

The meal was substantially the same as that used in Example 1. Twenty-five percent by weight of propylene glycol was added to the soybean meal. The product was extruded as described in Example 1 and produced an excellent soft dry fibrous material having a moisture content of 6.7% by weight and a propylene glycol content of 22.5% by weight.

EXAMPLE 5

Solvent extracted peanut meal having an equilibrium moisture content of 7.2% by weight was extruded with 25% by weight of propylene glycol added. The meal had a protein content of 50% by weight on an as is basis. The mixture was then extruded as described in Example 1. An excellent soft dry textured fibrous structure was formed by puffing as the product passed through the outlet nozzle of the extruder. The product had a moisture content of 3.1% by weight and a propylene glycol content of 22.0% by weight.

EXAMPLE 6

Brewers' yeast having a protein content of 52% by weight and an equilibrium moisture content of 12.6% by weight was mixed 25 parts by weight with 75 parts by weight of the soybean meal of Example 1 and was extruded with 20% by weight propylene glycol. The mixture was extruded as described in Example 1 with 3% addition of steam in the extruder. An excellent soft dry textured product was formed as the product puffed at the extruder outlet nozzle. The product had a moisture content of 7.3% by weight and a propylene glycol content of 17.5% by weight.

EXAMPLE 7

Solvent extracted fish meal having a protein content of 77.3% by weight and an equilibrium moisture content of 8.2% by weight was extruded with 25% by weight propylene glycol added. The product was extruded as described in Example 1. A product was formed having a moisture content of 4.1% by weight and a propylene glycol content of 23.4% by weight.

EXAMPLE 8

Vital wheat gluten having an equilibrium moisture content of 7.5% by weight and a protein content of 78.7% by weight was mixed 25 parts by weight with 75 parts by weight of the soybean meal of Example 1 and was extruded with 30% by weight of glycerol added. The product was extruded as described in Example 1. An excellent soft dry textured puffed product was obtained having a moisture content of 4.3% by weight and a glycerol content of about 28.5% by weight.

EXAMPLE 9

Toasted, solvent extracted soybean meal (50% protein) having an equilibrium moisture content of 8% by weight was mixed 75 parts by weight with 25 parts by weight of soybean press meal (41% protein, 8% moisture) and was mixed with 25% by weight glycerol. 0.5% by weight sulfur was added. A soft dry textured puffed product was obtained having a moisture content of 4.0% by weight and a glycerol content of 23.6% by weight by extruding the mix in the manner described in Example 1.

EXAMPLE 10

Toasted, solvent extracted soybean meal having a protein content of 50% by weight and an equilibrium moisture content of 8% by weight was mixed 75 parts by weight with 25 parts by weight of spray dried blood meal (83% protein, 7.5% water). The mixture was extruded with 25% by weight added glycerol. A soft dry textured product was obtained having a moisture content of 4.3% by weight and a glycerol content of 23.9% by weight by extruding the mix as described in Example 1.

It is realized that variations in these and related factors could be readily made within the concept taught herein. Hence, the invention is intended to be limited only by the scope of the appended claims and the reasonably equivalent methods, apparatuses, and products to those defined therein.

We claim:

1. A method of treating a protein-containing vegetable material to form a soft dry textured expanded food product comprising the steps of: providing a protein source material of the group consisting of oilseed meals, animal, fish and poultry by-product meals, and microbial protein having an equilibrium moisture content and a protein content between about 30 and 75% by weight; mixing an organic plasticizing solvent which is selected from the group consisting of glycerol, propylene glycol and mixtures thereof at a level of between about 10 and 50% by weight of the mixture and thereafter said mixture is heated to an elevated temperature above 212° F. and while applying elevated pressures for a time period sufficient to convert said mixture into a flowable substance; then forcing the heated, pressurized, plasticized, mechanically worked material through first restricted orifice means, maintaining the material under elevated temperatures and pressures as it emerges from said first restricted orifice means; and then extruding the material through second restricted orifice means into an environment of a pressure substantially lower than said elevated pressures causing expansion of the product with evaporation of at least part of the moisture and the formation of the expanded soft dry food product having a residual water content of between about 3–7% by weight as it emerges from the extruder.

2. A method of converting a protein-containing material into a soft dry expanded food product comprising the steps of providing a material from the group consisting of oilseed meal, animal, fish and poultry by-product meal, and microbial protein, having a protein content of between about 30 and 75% by weight, and an equilibrium moisture content; mixing an organic plasticizing solvent which is selected from the group consisting of glycerol, propylene glycol and mixtures thereof, at a level of between about 10% by weight but less than about 50% by weight of the mixture, and thereafter mechanically working the mixture while simultaneously heating it to a temperature of at least above 212°F. for a period of time sufficient to convert said mixture into a flowable substance while also applying an elevated pressure thereto; and then extruding the mechanically worked, heated and pressurized mixture through restricted orifice means into an environment of a pressure substantially lower than said elevated pressure to expand the material into a soft dry food product having a residual water content of between about 3–7% by weight as it emerges from the extruder.

3. The method in claim 2 wherein said material is extruded in stages by extruding the material through first restricted orifice means into a chamber under elevated temperature and pressure, and then through second restricted orifice means into said substantially lower pressure environment.

4. The method in claim 2 wherein said heating to the elevated temperature is within the range of about 270° to 370°F.

5. A method of producing a soft, dry expanded food product comprising the steps of: providing a protein source material from the group consisting of oilseed meals, animal, fish and poultry by-product meals and microbial protein having an equilibrium moisture content of less than about 12% by weight and a protein content between about 30 and 75% by weight, mixing an edible organic solvent with said material which is selected from the group consisting of glycerol, propylene glycol, and mixtures thereof at a level of between about 10 and 50% by weight of the mixture while maintaining the moisture content of said mixture less than about 12% by weight, applying elevated pressures and simultaneously heating said mixture while the moisture content of said mixture is substantially maintained to an elevated temperature above about 212°F. for a period of time sufficient to convert said material into a flowable substance and then extruding the heated pressurized mixture through restricted orifice means into an environment of substantially lower pressure causing expansion of the material to form an expanded dry food product which is soft in texture.

6. The method according to claim 5 wherein said heating to the elevated temperature is within the range of about 270°F. to 370°F.

7. The method in claim 6 wherein said elevated temperature is about 300°F.

8. The method in claim 6 wherein said elevated pressure is within the general range of 300 to 800 psi.

9. The method in claim 6 wherein said secondary protein source is soybean meal.

10. The method in claim 6 wherein the porous food product is formed into chunks with a tearing action to elongate the expanded material.

11. The method according to claim 6 wherein the expanded soft dry food product after extrusion through said second restricted orifice means has a residual water content of between about 3–7% by weight of the product.

12. The method according to claim 6 wherein the expanded soft dry food product after extrusion through said second restricted orifice means has an organic solvent content of between about 15 and 40% by weight of the product.

13. The method in claim 6 wherein said material is extruded in stages by extruding the material through first restricted orifice means into a chamber under elevated temperature and pressure, and then through second restricted orifice means into said substantially lower pressure environment.

14. The method in claim 13 wherein, after said material is forced through said first restricted orifice means, it is forced into and through an elongated zone of confinement while maintaining the material in confinement under said elevated temperatures and pressures; and then is extruded through said second restricted orifice means.

15. The method in claim 13 wherein said elevated temperature is about 300°F.

16. The method in claim 13 wherein said elevated pressure is within the general range of 300 to 800 psi.

17. The method in claim 13 wherein said secondary protein source is soybean meal.

18. The method in claim 13 wherein the porous food product is formed into chunks with a tearing action to elongate the expanded material.

19. The method according to claim 13 wherein the expanded soft dry food product after extrusion through said second restricted orifice means has a residual water content of between about 3–7% by weight of the product.

20. The method according to claim 13 wherein the expanded soft dry food product after extrusion through said second restricted orifice means has an organic solvent content of between about 15 and 40% by weight of the product.

21. A method of producing a soft, dry expanded food product comprising the steps of: providing a protein source material from the group consisting of oilseed meals, animal, fish and poultry by-product meals and microbial protein having an equilibrium moisture content of less than about 12% by weight and a protein content between about 30 and 75% by weight, preparing a mixture consisting of the protein material, and an edible organic solvent selected from the group consisting of glycerol, propylene glycol and mixtures thereof at a level of about 10–50% by weight of the mixture and thereafter subjecting the mixture to elevated pressure while simultaneously heating the mixture to an elevated temperature above about 212°F. for a period of time sufficient to convert said material into a flowable substance and then extruding the heated pressurized mixture through restricted orifice means into an environment of substantially lower pressure causing expansion of the material to form an expanded dry food product which is soft in texture.

22. The method in claim 21 wherein said heating to the elevated temperature is within the range of about 270° to 370°F.

23. The method according to claim 22 including the step of adding steam at a level of about 1–5% by weight of the mixture as the mixture is heated.

24. The method according to claim 23 wherein said heating to the elevated temperature is within the range of about 280°–320°F.

25. The method in claim 21 wherein said secondary protein source is soybean meal.

26. The method according to claim 21 wherein the expanded soft dry food product after extrusion through said second restricted orifice means has a residual water content of between about 3–7% by weight of the product.

27. The method according to claim 21 wherein the expanded soft dry food product after extrusion through said second restricted orifice means has an organic solvent content of between about 15 and 40% by weight of the product.

28. The method according to claim 21 wherein said edible organic solvent is mixed with the protein material at a level of about 25% by weight of the mixture.

29. The method in claim 21 wherein said material is extruded in stages by extruding the material through first restricted orifice means into a chamber under elevated temperature and pressure, and then through second restricted orifice means into said substantially lower pressure environment.

30. The method in claim 29 wherein said heating to the elevated temperature is within the range of about 270° to 370°F.

31. The method in claim 30 wherein said secondary protein source is soybean meal.

32. The soft dry expanded food product prepared by the method of claim 1.

33. The soft dry expanded food product prepared by the method of claim 2.

34. The soft dry expanded food product prepared by the method of claim 5.

* * * * *